(12) United States Patent
Sykes et al.

(10) Patent No.: US 9,420,650 B2
(45) Date of Patent: Aug. 16, 2016

(54) CIRCUITRY FOR LED LIGHT DIMMER

(71) Applicant: LSC Lighting Systems (Aust) Pty. Ltd., South Dandenong (AU)

(72) Inventors: Trevor James Sykes, Frankston South (AU); Gary Steven Pritchard, Blackburn (AU); Dejan Deletic, Glen Waverley (AU); David Lawrence Burchell, Frankston (AU)

(73) Assignee: LSC Lighting Systems (Aust) Pty. Ltd. (AU)

( * ) Notice: Subject to any disclaimer, the term of this patent is extended or adjusted under 35 U.S.C. 154(b) by 0 days.

(21) Appl. No.: 14/559,040

(22) Filed: Dec. 3, 2014

(65) Prior Publication Data

US 2016/0157313 A1    Jun. 2, 2016

(30) Foreign Application Priority Data

Nov. 28, 2014  (AU) ................................ 2014268272

(51) Int. Cl.
*H05B 33/08*    (2006.01)

(52) U.S. Cl.
CPC ........ *H05B 33/0818* (2013.01); *H05B 33/0845* (2013.01)

(58) Field of Classification Search
CPC ........... H05B 33/0815; H05B 33/0824; H05B 37/029; H05B 37/0281; H05B 41/2827; H05B 41/2928; H05B 41/3924; H05B 37/02; H02M 7/1557
USPC ......... 315/291, 246, 276, 307, 312, 315, 360, 315/DIG. 4; 323/282, 299
See application file for complete search history.

(56) References Cited

U.S. PATENT DOCUMENTS

| 4,223,195 | A | 9/1980 | Bechtel | |
|---|---|---|---|---|
| 4,339,670 | A | 7/1982 | Guajardo | |
| 8,212,494 | B2 * | 7/2012 | Veltman | H05B 33/0815 315/226 |
| 8,446,099 | B2 * | 5/2013 | McCune, Jr. | H05B 33/0815 315/250 |
| 8,796,954 | B2 * | 8/2014 | Zhang | H05B 33/0815 315/307 |
| 2011/0291583 | A1 | 12/2011 | Shen | |
| 2012/0049752 | A1 | 3/2012 | King et al. | |
| 2012/0319621 | A1 | 12/2012 | Sutardja et al. | |

(Continued)

FOREIGN PATENT DOCUMENTS

| DE | 102010039973 A1 | 3/2012 |
|---|---|---|
| EP | 2590477 A1 | 5/2013 |

(Continued)

OTHER PUBLICATIONS

Partial European Search Report for Application No. EP14196739 dated May 13, 2016.

*Primary Examiner* — Haissa Philogene
(74) *Attorney, Agent, or Firm* — Lerner, David, Littenberg, Krumholz & Mentlik, LLP

(57) ABSTRACT

Some embodiments relate to dimmer control circuitry for LED lighting, comprising: phase control circuitry to control the supply of voltage to at least one LED load, wherein the phase control circuitry comprises an AC switch to selectively provide voltage to the LED load for a first portion of a half cycle of an AC supply voltage, and a drive component to drive the AC switch so that the AC switch remains on for the first portion of the half cycle; and load switching circuitry to couple a dissipative load to an output of the AC switch during a second portion of the half cycle, wherein the second portion overlaps with the first portion.

18 Claims, 6 Drawing Sheets

(56) References Cited

U.S. PATENT DOCUMENTS

| | | | |
|---|---|---|---|
| 2013/0106298 A1* | 5/2013 | Datta | H05B 33/0815 315/186 |
| 2013/0162158 A1 | 6/2013 | Pollischansky | |
| 2014/0252980 A1* | 9/2014 | Salvestrini | H05B 37/02 315/246 |
| 2014/0333228 A1* | 11/2014 | Angeles | H05B 33/0815 315/291 |

FOREIGN PATENT DOCUMENTS

| | | |
|---|---|---|
| JP | S58108963 A | 6/1983 |
| WO | 2005115058 A1 | 12/2005 |
| WO | 2011063205 A1 | 5/2011 |

* cited by examiner

CIRCUITRY FOR LED LIGHT DIMMER

CROSS-REFERENCE TO RELATED APPLICATIONS

The present application claims priority from Australian Patent Application No. 2014268272 filed Nov. 28, 2014, the disclosure of which is hereby incorporated herein by reference.

TECHNICAL FIELD

Described embodiments relate generally to dimmer circuitry for capacitive loads, such as light emitting diode (LED) lighting, and to control units and systems including such circuitry.

BACKGROUND

In some situations, it is desirable to vary the intensity of light emitted from lighting, such as in stage production areas, auditoriums, meeting rooms and domestic scenarios. To vary the intensity of the light, a power dimmer can be used. A power dimmer is a mains powered device which, under command from an external control input, will control the intensity of a tungsten (filament) lamp. This control is commonly achieved using a technique called phase control, where the mains alternating current (AC) waveform is applied to the load for a time proportional to the required intensity of the lamp. For a bright lamp, the mains voltage is applied for the full ½ sine wave of each successive half-cycle of the mains AC cycle. For a dim lamp, a lesser portion of the half cycle is used. The tungsten lamps commonly used today are largely resistive and the dimmer is designed to drive this without issue.

LED lamp loads are commonly more reactive than tungsten lamp loads, with the LED device capacitance being the contributing parameter. There are trace inductances and resistance in LED lamps but the capacitance is generally a significantly greater contributor to the device reactance.

A regular resistive lighting load is predominantly resistive, so the current and voltage waveforms are generally in phase at all times. However, when dimming an LED light, the current and voltage become out of phase due to the capacitance of the LED. When the AC voltage waveform is applied to the LED, the internal device capacitance charges up to the applied voltage and remains there. When the voltage drops and passes through zero (at the zero crossing point of the AC mains voltage), the charge of the capacitance begins to flow back into the dimmer output. This causes the current waveform to reverse and causes the Triac (which is an AC switching device for the dimmer output stage) to retrigger and continue to conduct into the next ½ mains cycle. This causes the LED to receive full line voltage so the LED flickers to full brightness. This is known as a "flicker to full". This problem becomes more prevalent with more LED loads being connected to a single drive circuit, as the bulk capacitance can increase to the point where the Triac will not be able to turn off.

The second issue with an LED is that it represents a very small load (current/wattage). A typical small-filament lamp will draw around 60 W, for example, which is fine for most dimmers. However with a small load, as with an LED, some dimmer circuits will have trouble making the Triac switch on and remain switched on. The reason for this is that most dimmers are fired by optoelectric devices and the circuit configuration is such that the Triac depends on the lamp loading to properly switch on the Triac. If the load is too small, the Triac will not latch and the output of the dimmer will fall back to zero volts after being activated. This is known as a "flicker to off".

The problems described above are that too small a load is fed from an optoelectronic coupler-fired dimmer, which causes the Triac to not latch on, and too large an LED load (due to too much bulk capacitance), which causes the Triac to re-fire sporadically. The combined effect of these two conditions is to cause an LED dimmer circuit to misfire in various situations or to cause the LED to not be able to turn off.

It is desired to address or ameliorate one or more shortcomings or disadvantages of prior dimmer circuits for LED loads, or to at least provide a useful alternative thereto.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

SUMMARY

Some embodiments relate to dimmer control circuitry for LED lighting, comprising:
phase control circuitry to control the supply of voltage to at least one LED load, wherein the control circuitry comprises:
an AC switch to selectively provide voltage to the LED load for a first portion of a half cycle of an AC supply voltage, and
a drive component to drive the AC switch so that the AC switch remains on for the first portion of the half cycle; and
load switching circuitry to couple a dissipative load to an output of the AC switch during a second portion of the half cycle.

The second portion may overlap with the first portion during part of the half cycle, such as during a trailing portion of the half cycle. The circuitry may further comprise the dissipative load, and the dissipative load may comprise a resistor. The AC switch may comprise a Triac. The drive component may comprise a transformer arranged to provide a drive current to the AC switch. The drive component may comprise a gated oscillator to drive the transformer at a drive frequency that is at least two orders of magnitude higher than a frequency of an AC mains supply to which the circuitry is coupled. The drive frequency may be between about 2 kHz and about 100 kHz.

The second portion may be a predetermined proportion between about 6% and about 10% of the half cycle. A phase angle of the first portion may be dependent on timing signals received by the voltage control circuitry. The voltage supplied to the at least one LED load may be a modulated AC mains voltage. The at least one LED load may comprise a plurality of LED lights in parallel.

The load switching circuit may comprise at least one transient voltage suppressor. The load switching circuit may comprise a timing circuit to set a time constant of the load switching circuit. The load switching circuit may comprise a fuse disposed intermediate the dissipative load and an output of the phase control circuitry.

Some embodiments relate to a control unit comprising the circuitry described herein and further comprising a processor to generate and transmit first timing signals to the phase control circuitry and second timing signals to the load switching circuitry.

The first timing signals may be determined by the processor based on dimmer setting signals received at a control input of the processor.

The second timing signals may be generated based on a pre-selected load setting stored in a memory accessible to the processor.

The control unit may comprise a plurality of the dimmer control circuitry responsive to the processor to control respective dimmer control channels for respective lighting loads, each lighting load comprising at least one LED or at least one resistive lighting load.

Some embodiments relate to a lighting control system comprising the control unit of described herein and further comprising a control input interface to provide dimmer setting signals to the processor.

Some embodiments relate to control circuitry to vary AC power provided to a capacitive load, the control circuitry comprising: a first switching element to connect the capacitive load to an AC supply at a first phase angle of the AC supply to vary the AC power provided to the capacitive load; and a second switching element to connect the capacitive load to a neutral line via a dissipative load at a second phase angle of the AC supply to release charge from the capacitive load. The capacitive load may include one or more LED lighting loads.

Some embodiments relate to a method of dimmer control for LED lighting, comprising:

selectively providing voltage to an LED load via an AC switch for a first portion of a half cycle of an AC supply voltage; and coupling a dissipative load to an output of the AC switch during a second portion of the half cycle, wherein the second portion overlaps with the first portion during part of the half cycle.

BRIEF DESCRIPTION OF DRAWINGS

Embodiments are described in further detail below, by way of example, with reference to the accompanying drawings, in which.

DETAILED DESCRIPTION

Figure 1:
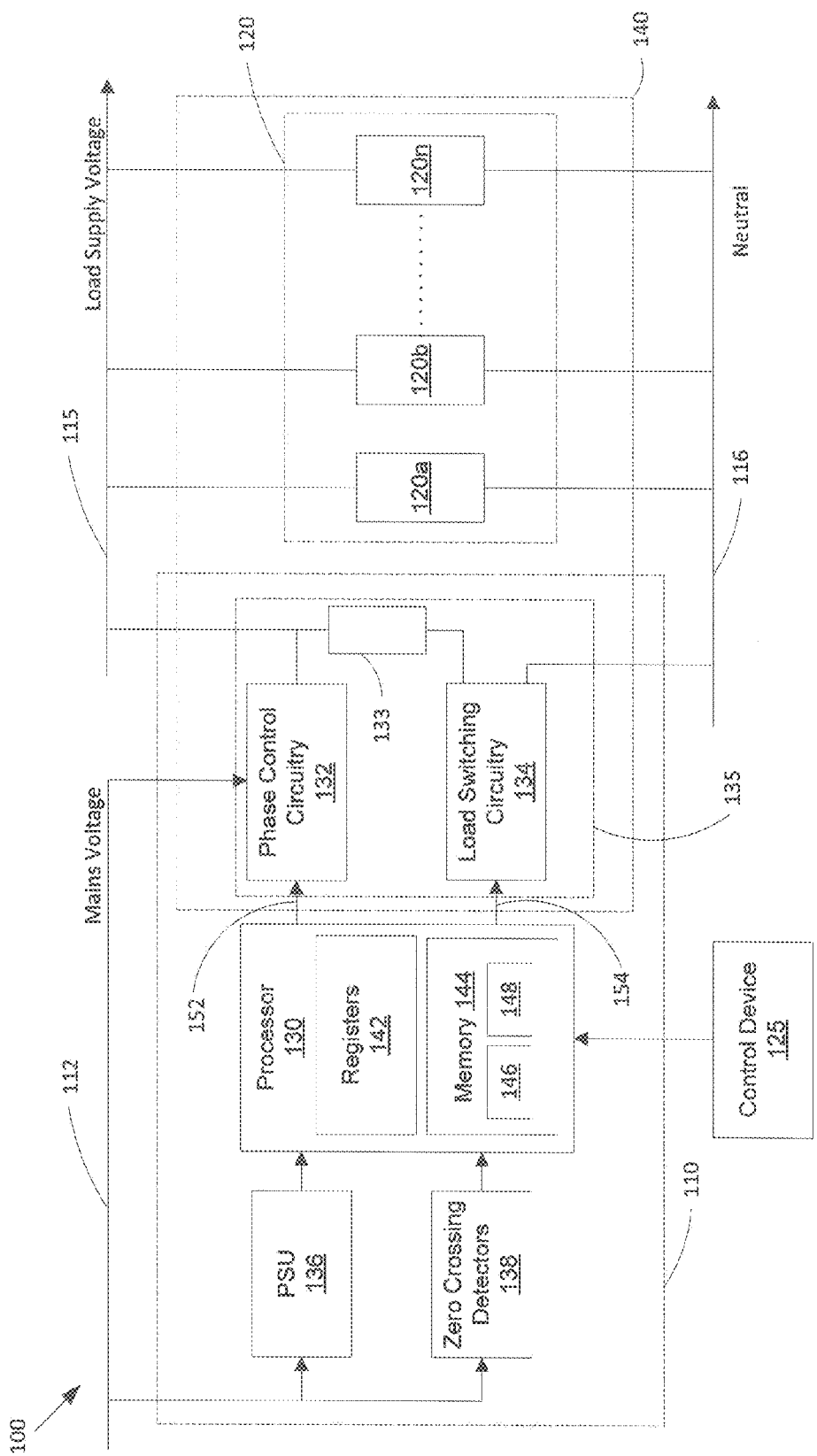
FIG. 1 is a block diagram of a dimmer control unit comprising dimmer control circuitry according to some embodiments.

Described embodiments relate generally to dimmer circuitry for dimming capacitive lighting loads, such as LED lighting, and to control units and systems including such circuitry. In particular, such embodiments provide controlled compensation for preventing or at least mitigating flicker problems in dimmer-controlled LED lighting.

Referring to FIGS. 1 to 6B, embodiments of a lighting control system 100 are described in further detail. Control system 100 comprises a control unit 110 that is normally arranged to receive an AC mains supply voltage 112 and to control the supply of a load supply voltage 115 to one or more lighting loads, such as LED loads 120. The load supply voltage 115 is a modulated form of the mains voltage 112. Both the mains voltage 112 and the load supply voltage 115 are complemented by a neutral rail 116, to which the control unit 110 and LED loads 120 are also coupled.

The control unit 110 comprises a processor 130 (which may include more than one processing device) and dimmer control circuitry 135 to control the load supply voltage 115 supplied to the LED loads 120. Control unit 110 further comprises a power supply unit (PSU 136) and one or more zero crossing detectors 138 coupled to the mains voltage 112 and arranged to provide output voltage and/or signals to processor 130. The processor 130 receives the output from the one or more zero crossing detectors 138 and generates timing signals 152 and 154 to the dimmer control circuitry 135 based on the output from the one or more zero crossing detectors 138 and optionally also based on control signals received from one or more external control devices 125.

Based on the timing signals 152 and 154 received from the processor 130, the dimmer control circuitry 135 generates the load supply voltage 115, which is effectively a modulated form of the AC mains voltage 112, to drive (power) the LED loads 120. The dimmer control circuitry 135 comprises phase control circuitry 132 that receives first timing signals 152 from the processor 130. Dimmer control circuitry 135 further comprises load switching circuitry 134 that receives second timing signals 154 from the processor 130. Further, the dimmer control circuitry 135 comprises a dummy load 133, which may be a dissipative, resistive load, for example, coupled in parallel to the output of the phase control circuitry 132, such that the dummy load 133 can dump the stored charge from LED loads 120 to the neutral rail 116.

The processor 130 comprises one or more memory components, which comprise registers 142 and non-volatile memory 144. The registers 142 store one or more dimmer settings for respective control channels to set the proportion of the AC wave form to be applied to the LED load 120 (i.e. applying suitable phase control). The non-volatile memory 144 comprises processor-readable code modules 146 and 148 to track and compensate for variation in the mains voltage 112 and to generate suitable firing signals 152, 154 based on received and stored dimmer intensity settings, for example. Additionally, the non-volatile memory 144 may store specific settings for different loads or load types, as described further below.

The described dimmer circuitry 135 is configured to drive a wide range of loads, such as very small loads, for example in the region of <<1 W, and large loads, for example loads in excess of 15,000 watts, all from the same drive circuit and without suffering from the "flicker to off" problem for small loads or the "flicker to full" problem for larger loads.

The phase control circuitry 132 has a Triac 210 controlled to switch the mains voltage to the LED load 120 at a predetermined phase angle according to the dimmer setting stored in the processor 130. As described above, the Triac may tend to switch off in circumstances where the LED load 120 is low. One way to address the issue of the Triac 210 failing to remain on is to fit the dummy load 133 to the output of the dimmer circuitry 135 in parallel with the LEDs 120. This parallel resistive dummy load 133 provides suitable minimum load current to cause the Triac to latch on correctly (which corrects the "flicker to off" problem) and also provides a suitable parallel resistance to dump the excess voltage/current in the load to stop the Triac re-firing sporadically. A useful value of this dummy load may be between 500 W and 1000 W, for example, for a typical LED light configuration.

While adding the dummy load is a good solution, a drawback is that this load must be present in the circuit at all times and it can consume a lot of power, which negates one of the reasons to use LEDs in the first place. Additionally, if the dummy load fails (as it is liable to do at some time), then the flickering will appear at some time later in its useful life.

Described embodiments use the dummy load 133 but only switch it in when it is required. That way, the dummy load 133 can be physically small but still appear to be a similar load to a lamp with a power in the range of 550 Watts to 1 KW. This switching dummy load 133 is connected across the output of the Triac 210 and is controlled from the dimmer control circuitry 135.

Described embodiments use a further technique to make sure the Triac 210 is controlled correctly every time. Specifically, the Triac 210, which is used as the main AC switch, is driven not by using an opto-coupler system but by using a pulse transformer 208 (FIGS. 2 and 4) to physically inject current into the Triac 210 when it is fired, which forces the Triac to turn on regardless of the load. Further, the Triac 210 is continually fired during the firing time to ensure that it stays on. The pulse transformer 208 is used in the dimmer control circuitry 135 as the load 120 can be a very low value and this technology will ensure the Triac 210 fires, thus addressing the latching issue and the "flicker to off" problem.

For the dummy load 133, a fixed power resistor of about 100Ω, for example, may be fitted across the output of the dimmer to the neutral line of the mains supply and is switched into the output of the phase control circuitry 132 at the end of each AC ½ cycle in order to dump the line voltage and resulting current from the load 120. The use of a 100Ω resistor (or similar) for the dummy load 133 allows a balance between having sufficient load to dampen the line voltage/current and thermal considerations of too much power being dissipated in the dummy load 133, which might lead to the dummy load 133 overheating and failing.

The result of this mix of technologies in the LED dimmer circuit 135 is to provide smooth flicker-free dimming of dimmable LED loads between 1 and about 50 to 100 or more LEDs in parallel per dimmer circuit 135. There is no minimum wattage LED that can be dimmed. There is an upper limit of the number of LEDs that the circuit can cope with but this upper limit is somewhat arbitrary since the value of capacitance of different types of LED varies widely. High-capacitance LEDs may effectively set the upper limit to about 50 LEDs. Different LEDs will, however, allow strings of up to 150+ LEDs in parallel to be dimmed. The reason this limit exists is due to the cumulative total (bulk) capacitance of the LEDs, which is required to be dissipated in sufficient time to prevent the Triac 210 from re-firing. This limit arises as a physical limitation of the RC time-constant of the system, the series wiring resistance and the circuit values chosen. When a plurality of dimmer circuits 135 are used in parallel under the control of the same processor 130 (as described further herein in relation to FIG. 3), lighting systems including more than 1000 LEDs can be effectively dimmed without encountering the flicker problems described above.

The dimmer circuit can be considered to act like a power factor correction circuit because it makes the out-of-phase voltage and current in the LED circuit come back into phase at the zero crossing. However, the voltages and currents in the preceding portion of the waveform will be out-of-phase and therefore they are not strictly power factor corrected. The load switching circuitry of the dimmer circuitry may alternatively be described as a dampening circuit or an LED compensation circuit.

The control system 100 can employ a number of dimmer control channels 140, with each dimmer control channel being governed by a dedicated dimmer control circuit 135 and providing power to a respective LED load 120a, 120b, . . . , 120n (each of which may include a single LED or a large plurality of LEDs). For example, the control system 100 may be provided in 6 or 12 channel versions or in single or dual channel versions. However, as each channel is identical, the number of channels in the dimmer system configuration can be scaled to suit a particular lighting installation requirement.

Figure 3:
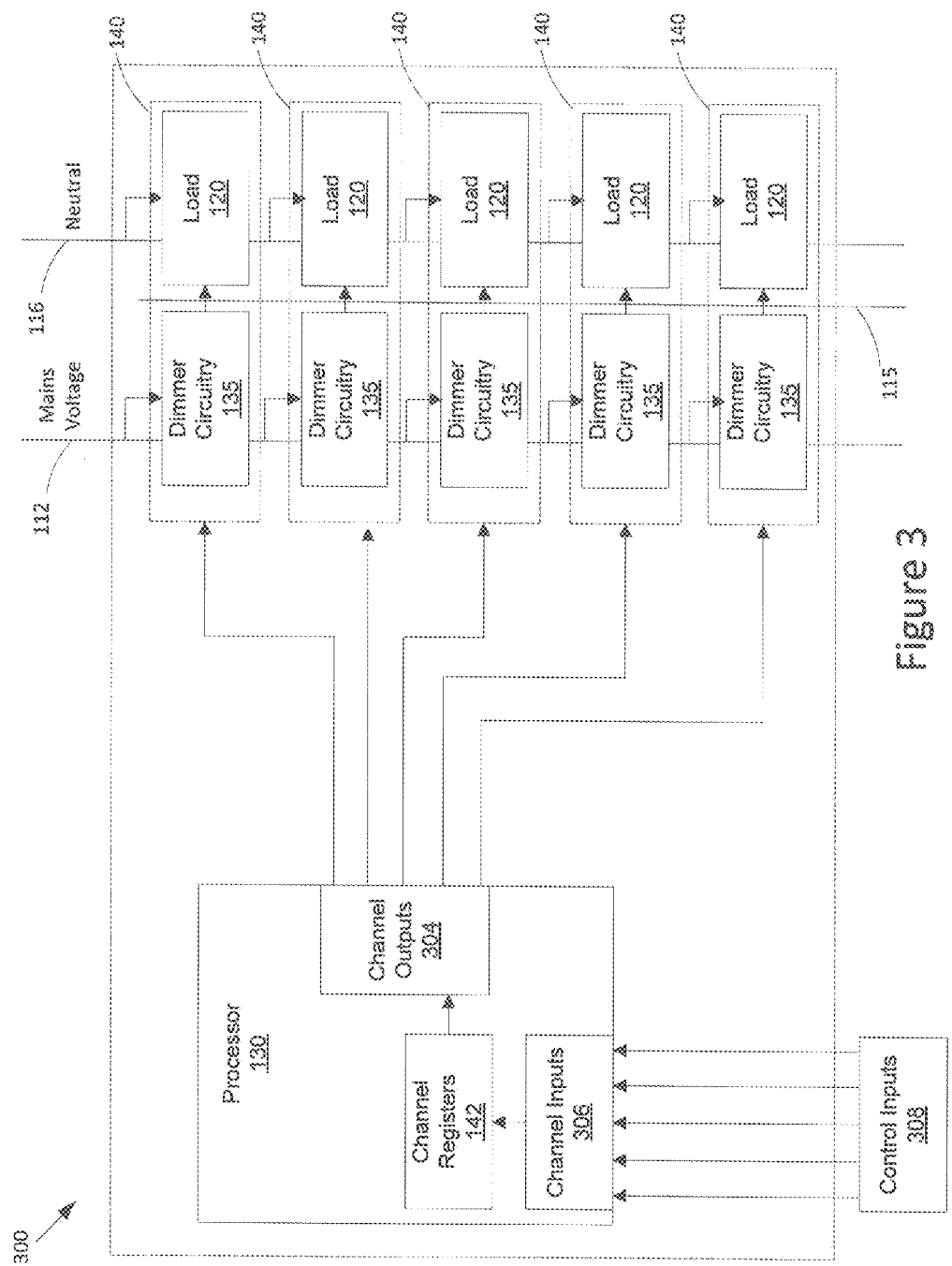
FIG. 3 is a block diagram of a dimmer control unit configured to control multiple dimmer control circuits according to some embodiments.

Referring in particular to FIG. 3, some embodiments of system 100 may employ a control unit 300 that is the same as control unit 110, except that it allows for multiple dimmer channels to be controlled through the same processor 130. In such a control unit 300, the processor 130 has multiple channel inputs 306 and multiple channel outputs 304 to drive a series of dimmer channels 140 that are each fed by the same mains voltage 112, where each of the dimmer channels 140 comprises the dimmer circuitry 135 and an LED lighting load 120. The loads 120 across the various dimmer channels 140 may vary in the number of LEDs that they include, as well as the type and capacitance of the LEDs. The dimmer circuitry 135 of each dimmer channel 140 provides a separate modulated AC voltage supply 115 to each of the loads 120 to which it is coupled. For each channel 140, the modulated supply voltage 115 may be different due to different dimmer settings being received from control inputs 308 and stored for the particular channel. Hence, different timing signals may be received at the dimmer circuitry 135 for different channels from channel outputs 304. The channel registers 142 of the processor 130 are configured to store the channel settings received via channel inputs 306 and the processor 130 accesses the settings stored in the registers 142 when generating the timing signals 152, 154 for each channel via the channel outputs 304. Thus, in some embodiments, processor 130 can be used with multiple dimmer control circuits 135 across multiple channels for multiple respective LED loads, each of which may require different compensation due to different inherent capacitance in the loads.

Figure 2:
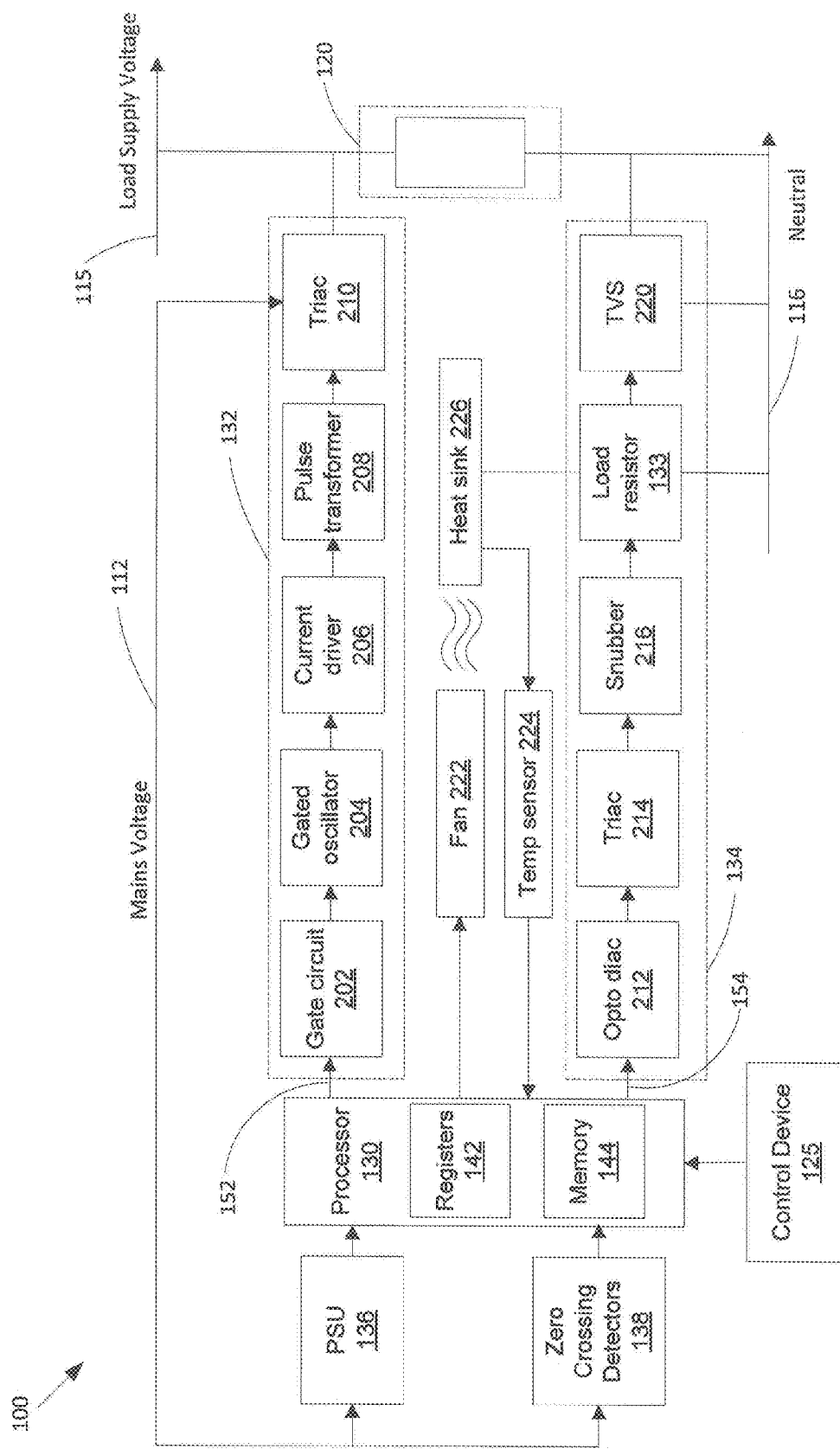
FIG. 2 is a block diagram of the control unit of FIG. 1, showing some of the dimmer control circuitry in further detail.
Figure 4:
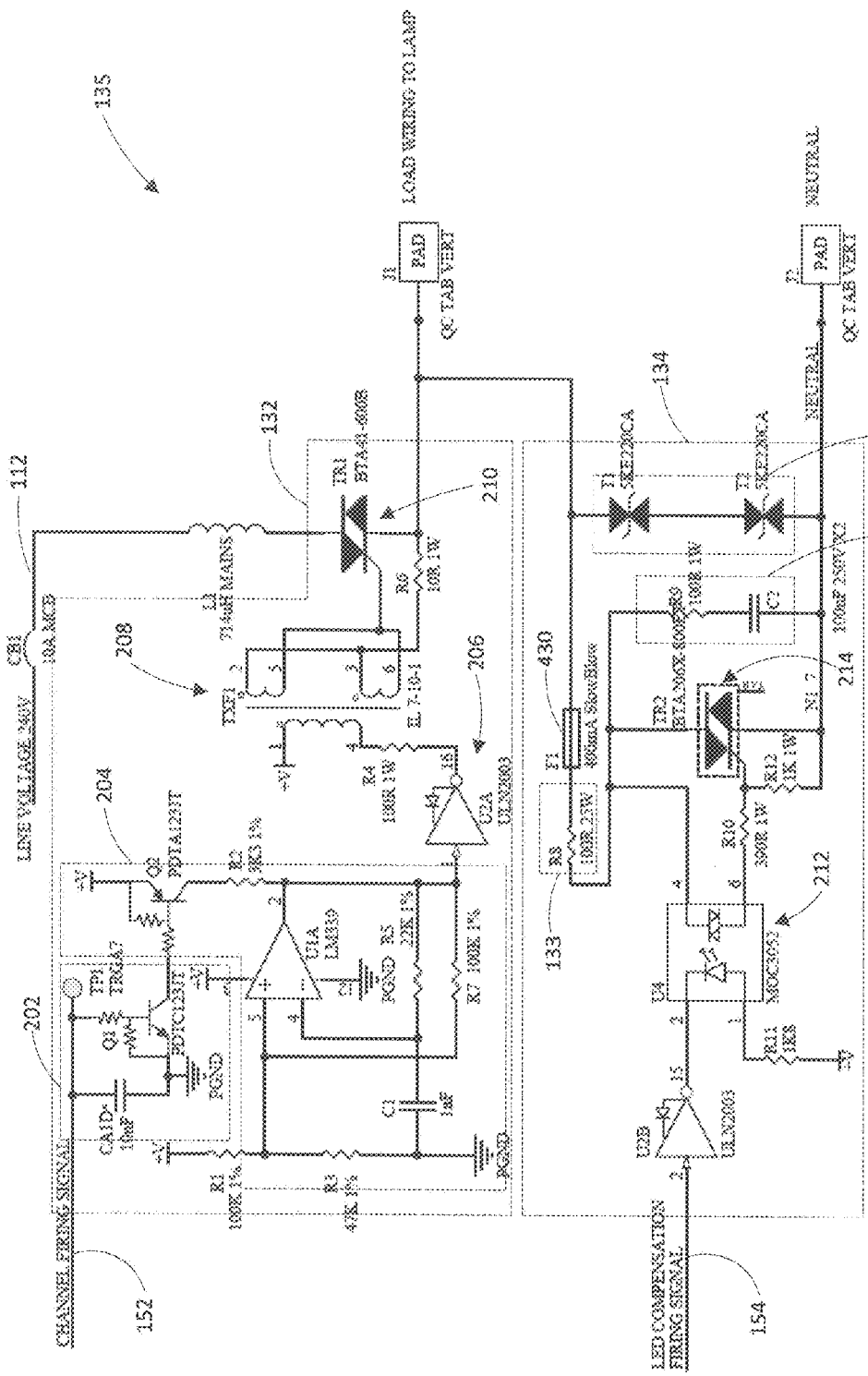
FIG. 4 is a schematic diagram of dimmer control circuitry according to some embodiments.

FIGS. 2 and 4 show the dimmer circuitry 135 in further detail for 1 dimmer channel. In the voltage control circuitry 312, the firing signal 152 received from the microprocessor 130 enters the base of transistor Q1 and is phase controlled and synchronized to the zero crossing signal from the zero crossing detector 138. This transistor Q1 turns on transistor Q2 which together form a gate circuit 202 and provide the pull-up for the self-oscillator circuit 204 to start. The oscillator circuit 204 is formed by comparator U1A, resistor R1, resistor R2, resistor R3, resistor R5, resistor R7 and capacitor C1. R1 and R3 provide the threshold voltages for the comparator, while R7 provide a level of hysteresis to prevent high speed transitions within the comparator. C1 and R5 provide an RC circuit to set the timing of the oscillator circuit 204 and the frequency of oscillation which is approximately 35 kHz. The configuration of the oscillator circuit 204 is such that it will rest in the same condition (output low) when it is not enabled by the firing signal 152 and will start up and oscillate in a constant amount of time every time it becomes enabled. This ensures a near jitter-free firing edge for the oscillator output. If this firing edge is not carefully controlled, the LED lamp or lamps may flutter slightly.

The output from the oscillator circuit 204 is fed to a Darlington driver comprising a comparator U2A, which acts as a current drive circuit 206 and provides current buffering to drive the primary side of a pulse transformer 208 (TXF1). Two secondaries of the pulse transformer 208 are connected in parallel and in turn connected to the Triac 210 and phased accordingly so that the Triac 210 is fired in quadrants 2 and 4. Resistor R6 provides current limiting for the Triac gate circuit. The M1 terminal of the Triac 210 is connected via an inductor L1 to a circuit breaker CB1 and the mains supply 112. The inductor L1 forms an LRC filter to reduce radio frequency (RF) emissions when the Triac 210 fires.

The load switching circuitry 134 controls the turn on of the dummy load resistor 133, which is connected from the dimmer output to the neutral 116. A timing control signal 154 from the microprocessor 130 triggers Darlington driver circuit (IC) U2B. This provides current buffering to the LED in the opto-coupler 212. The output of the opto-coupler 212 comprises a Diac connected to the gate circuit of Triac 214. In contrast to Triac 210, which is driven by the pulse transformer 208, Triac 214 is driven by the opto-coupler 212. Voltage output from the phase control circuitry 132 (and specifically Triac 210) is a phase-controlled mains voltage and will allow the gate of Triac 214 to turn on when the opto-coupler 212 is enabled. Resistor R10 at the gate of Triac 214 limits the Triac gate current and resistor R12 is a bleed resistor to allow the Triac gate to discharge and turn off at the zero crossing.

Resistor R9 and capacitor C2 form a snubber circuit 216 to limit the rate of rise time across the Triac 214 to prevent mis-firing due to a high rate of change of current over time. Resistor R8 is the dummy load resistor 133. If rated at 25 W with a value of 1000, for example, when switched in, the dummy load resistor 133 presents an equivalent 576 Watt load to the output of phase control circuitry 132, which will dump the line current from load supply 115 and stop the Triac 210 re-firing.

Fuse F1 (430 in FIG. 4) is sized and configured to trip (go open-circuit) if the microprocessor 130 fails and fires the load switching circuit 134 continuously for a minimum number of cycles or half-cycles to protect the dummy load 133 from significant thermal damage. The fuse 430 may be selected to have a type and rating so that the minimum number of cycles is in the range of 4 to 10, optionally around 5.5, for example. This allows for the situation where a noise spike fires the load switching circuit 134 at the wrong moment and causes the dummy load 130 to be switched into the output of the phase control circuit 132 for a full half cycle. The rating and type of the fuse 430 therefore stops a noise signal from rendering the load switching circuit 134 output inoperative. A transient voltage suppressor (TVS) circuit 220 is coupled in parallel to the dummy load 133 and the snubber circuit 216. For example, the TVS circuit 220 may comprise diodes T1 and T2 that are high voltage regulator/clamp diodes, forming a 440V clamp of the output voltage.

The combination of the line filter inductor L1 and the LED capacitance will form an LC tuned circuit and as such the output will ring and peak to high voltages as the output switches on and off. The TVS circuit 220 (transient diodes T1 and T2) will clamp this overshoot to under 580V, which will help to prevent damage to the LED loads 120 from excess voltages.

The dummy load resistors 133 for each channel are thermally bonded to a heat sink 226 (FIG. 2) on the front panel (not shown) of the control system 100 to remove heat. Temperature sensors 224 on this heat sink 226 report its temperature to the processor, which will enable a dimmer cooling fan 222 as needed.

Figure 5A:
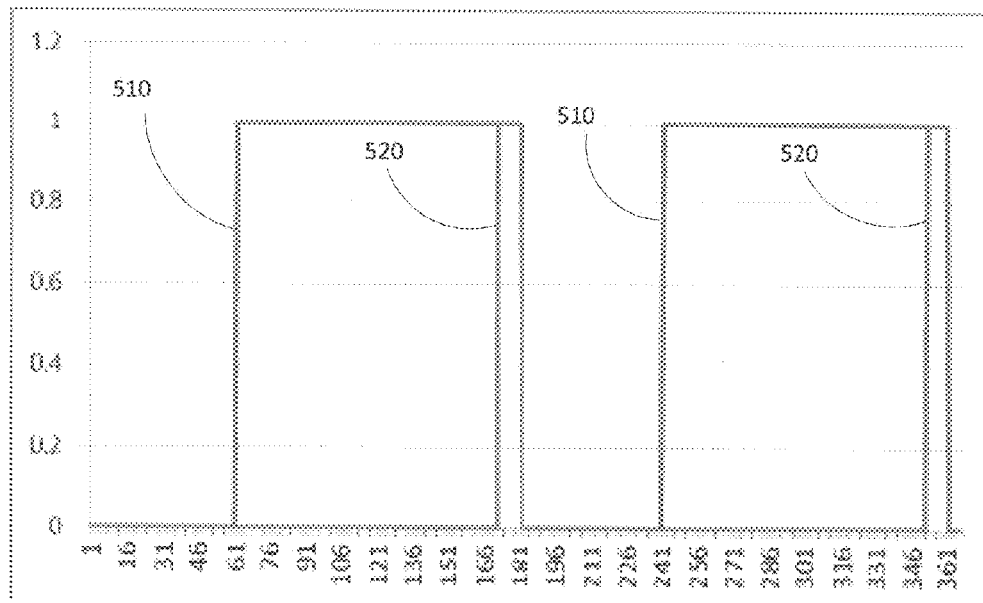
FIGS. 5A and 5B are graphs illustrating example timing signals for controlling the dimmer control circuitry.
Figure 5B:
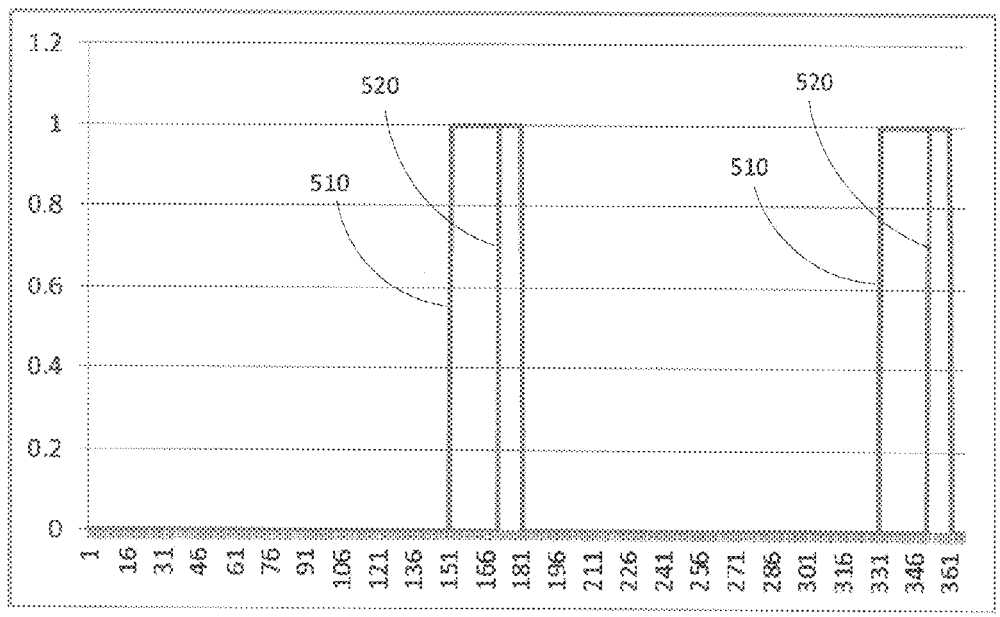

FIGS. 5A and 5B are graphs of amplitude on the y-axis versus phase angle on the x-axis, illustrating example timing signals provided from the processor 130 to the dimmer control circuitry 135. FIG. 5A illustrates timing signals for relatively high intensity dimmer settings, while FIG. 5B illustrates timing signals for relatively low intensity dimmer settings. In FIGS. 5A and 5B, a leading (turn on) edge of the timing signal 152 for the phase control circuitry 132 is indicated by reference numeral 510, while the leading (turn on) edge of the timing signal 154 provided from the processor 130 to the load switching circuitry 134 is indicated by the reference numeral 520. The phase control circuitry 132 is commonly driven for a larger portion of the AC half cycle than the load switching circuitry 134, which is only switched in towards the end of the half cycle. However, the dimmer circuitry 135 allows for the leading edges 510 and 520 to generally coincide or for leading edge 520 to occur prior to leading edge 510.

Figure 6A:
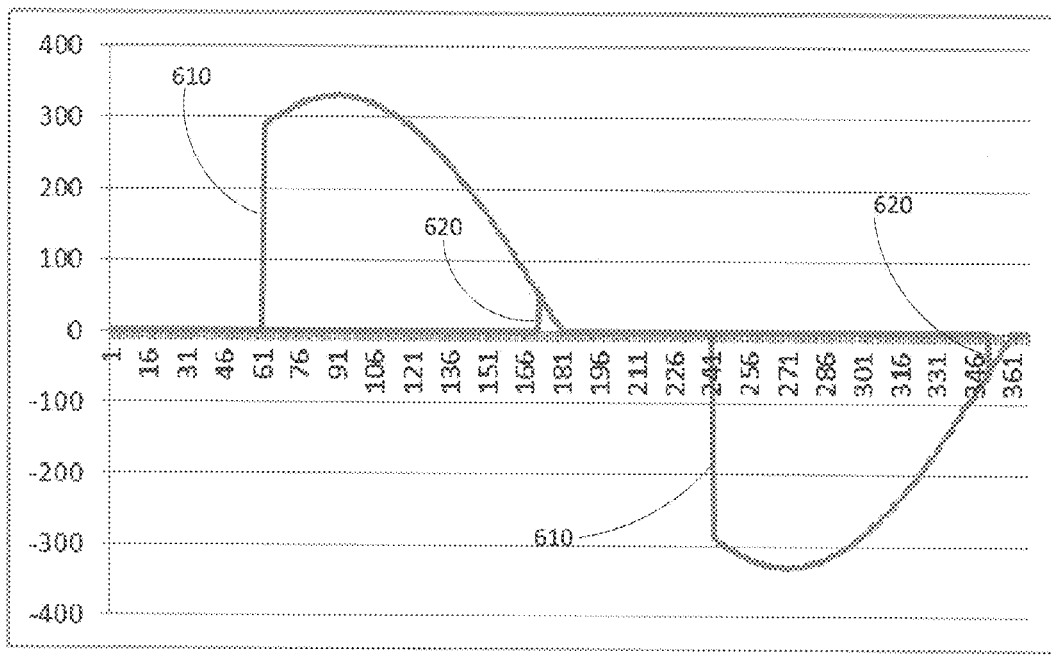
FIGS. 6A and 6B are graphs illustrating example modulated output signals to the LED load, generated according to the example timing signals of FIGS. 5A and 5B as applied to the dimmer control circuitry of FIG. 4.
Figure 6B:
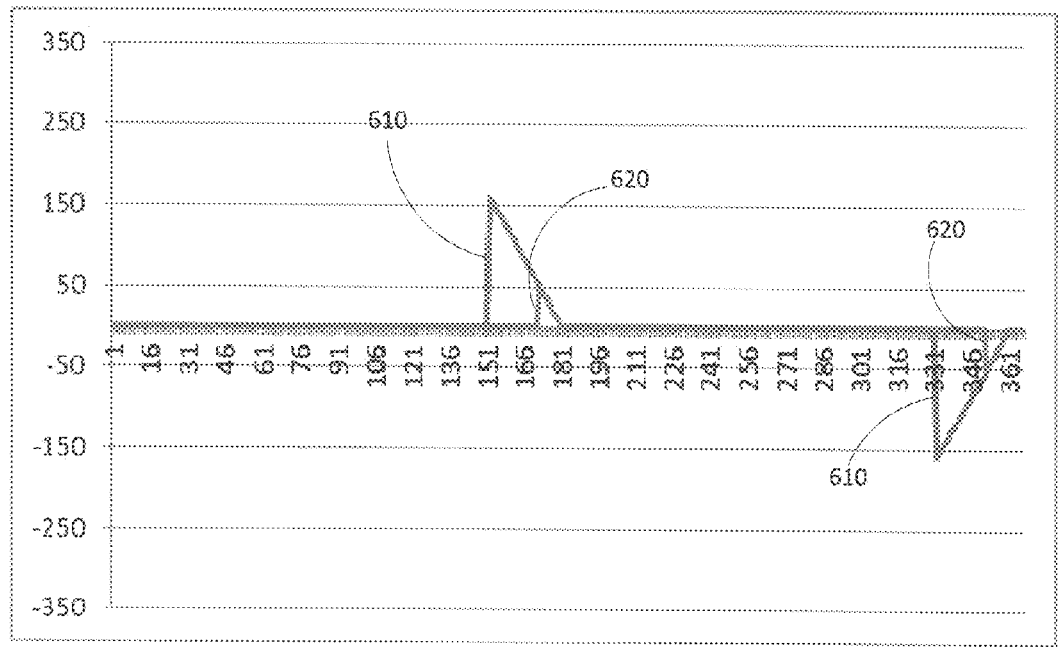

FIGS. 6A and 6B show amplitude on the y-axis versus phase angle on the x-axis to illustrate the effect of the timing signals 152, 154 as applied to phase control circuitry 132 and load switching circuitry 154 illustrated in FIGS. 5A and 5B, respectively. FIG. 6A illustrates the output of the Triac 210 when the phase control circuitry 132 is turned on by timing signals 152, such that leading edge 610 corresponds to (and is directly correlated to) leading edge 510. Similarly, the leading edge 620 indicates when the load switching circuitry 134 is switched on towards the end of the AC half cycle. Leading edge 620 corresponds to (and is directly correlated to) leading edge 520.

Software stored in Memory 144 and executed by the processor 130 controls the operation of the dimmer circuitry 135. The software controls all aspects of the timing of the control system 100 so as to ensure smooth, jitter-free and flicker-free control of the LED.

Data input for system control can be received from multiple sources, such as external control devices 125 or other control inputs 308 (FIG. 3). Examples of such control devices 125 or control inputs 308 include, a control console, internal preset memories (that may be recalled using remote control wall plates, for example), input from a local "riggers" control on the actual dimmer or the dimmer may be triggered from a BMS (Building Management System) such as a fire panel or alarm system, to trigger an emergency memory for instant and overriding recall of a lighting state suitable for emergency situations. For the purposes of the LED drive provided by control unit 110, the data source is irrelevant since the required channel level is stored in the appropriate channel register 142 and passed from the input processing engine 146 to the output firing engine 148 regardless of the source of the data.

In some embodiments, fading from one dimmer setting to another is controlled using 16 bit values, which provides a higher degree of continuity across incrementally changing intensity values of the lighting as it is dimmed or raised. A previous dimmer used 12 bit values, but it was found that this produced visible steps when fading so the software was expanded to 16 bit operation to provide a more visibly smooth transition from one lighting state to another.

Control from digital multiplexer (DMX) sources, such as control desks, is traditionally 8 bit. Using 8 bit for an LED is a poor choice as the step changes in intensity when fading are very noticeable. The control unit 110 has been configured for 16 bit dimming to reduce the step size and to make the output as smooth as possible.

The dimmer control unit 110 works by synchronizing the output drive (load supply voltage 115) to the actual mains waveform 112 and the delay or timing of firing signals 152, 154 to drive the outputs of phase control circuitry 132 and load switching circuitry 134. The processor 130 must detect when the incoming mains voltage crosses the zero voltage point between alternative ½ cycles (based on output from the zero crossing detector 138) and wait an amount of time before turning the Triac 220 on. This time delay may be anywhere between 0 and 9.5 mSec (for a 50 Hz system), for example. The mains waveform 112 ideally is a clean sine wave but such waveforms are seldom clean and there are frequently additional noise spikes on the mains waveform 112 due to motors, fluorescent tubes and a range of other noise sources, which all have to be processed and digitally filtered. The zero crossing detector software in zero crossing detectors 138 includes a high order band pass filter designed to accept signals within an expected window and to reject pulses outside this window. Then once a series of pulses is received, the series is digitally processed and filtered to resolve the required zero crossing signal for correct synchronization.

As the mains can vary in frequency over the course of a day, the software dynamically tracks this variance and can alter the acceptance window and filter characteristics. The range of mains variance tracking is set to allow operation across the world and accordingly the range of frequencies accepted is 42-68 Hz. (50-10% is 44 Hz less 2 Hz of headroom for the software to be able to process the lower limit and 60 Hz+10%+2 Hz of headroom to allow the software to track the upper frequencies). With changes in mains frequencies, there are changes in the slope of the sine wave, so the acceptance windows and filtering are adapted to process this narrower pulse width. For 60 Hz detected systems, the acceptance window is reduced slightly compared with a 50 Hz system. With so many LEDs now in operation and due to the type of load these devices are, the mains waveforms can become distorted and non-sinusoidal. Accordingly, the synchronization to the mains voltage 112 is becoming more difficult for the zero crossing detection engine 138 and accordingly variable acceptance window limits are employed to allow for compensation.

The output firing engine 148 comprises the software code responsible for sending timing signals 152, triggering the Triac 210 to turn on and turning the LED lights on. The timing signals 152 output from the output firing engine 148 are configured to be stable to be able to accurately fire the output without jitter. Jitter can occur when the delay from the zero crossing signals varies (or jitters) for a constant input, with the result that the power delivered to the LED load 120 also varies. In a standard filament lamp, some jitter is generally not a problem, but for an LED which is very sensitive to voltage fluctuations, avoidance of jitter is desirable. To produce minimal jitter requires precise mains synchronization and timing algorithms to make the firing point as stable in time as possible. The control unit 110 is therefore configured to have a relatively high output stability (and low timing variation) in timing signals 152, 154, with an example timing variation of approximately 22-25 microseconds.

The signal processing performed by the input signal processor software code (input processing engine) 146 of processor 130 to produce the minimal amount of jitter possible involves setting the zero crossing interrupts to highest priority, setting the interrupt processing algorithms within input signal processor software code 146 to the highest priority as the signal is processed as soon as it is detected, optimizing the interrupt processing control loops to execute in as short a time as possible (e.g. less than 1 mSec), using a fast processor with high instruction execution speed and using high speed and high precision internal system timers for time keeping and calculation.

The timing control software code (output firing engine 148) is configured to fire the compensation circuit early enough to allow time for the load resistor 133 to discharge the line current/voltage while not overheating the load resistor 133 due to being turned on for too long. A combination of the load resistor value and the firing time is selected to give an optimal tradeoff between being able to dump the line voltage to prevent misfiring and not overheating the dampening componentry.

Software features allow for different levels of compensation to cater varying load line length and varying numbers and types of LEDs on the line. For example, the software stored in (or accessible to) and executable by the processor 130 may provide multiple (e.g. three) settings for compensation damping. Such settings may include Low, Medium and High settings, for example, to cater for different configurations. Each progressively higher setting provides a different compensation firing angle, so that the resistor has increased time to discharge the line, thereby increasing the portion of the AC half cycle for which the dummy load 133 is coupled into the output of the Triac 210, but it also means the dummy load 133 will dissipate more energy and get hotter.

Choice of the firing times for the three levels can be done manually at installation time by a trial and error method. First, channels are driven up and down using level 1 (Low). If the LEDs appear to be stable at this setting, the level is locked in at level 1. If some flickering is evident at that setting, for example due to a high number of LEDs fitted (and therefore a high system reactance), the user will then set the level to setting 2 (Medium), repeat the test and so on. The drive time for these different levels is determined both empirically and by design calculation. As the loaded output can be any length and contain any combination of LEDs, a line characteristic reactance cannot be determined. Bench and field testing along with extensive design calculations gives us a suitable level 1 drive figure and load resistor. From this a level 3 (High) setting value can be determined as the upper end of the power the load system can absorb. Level 2 setting is set to a value that is a split half-way in between levels 1 and 3.

The software stored in (or accessible to) and executable by the processor 130 additionally has settings suitable for different load types. There is a setting for a tungsten load, which when selected will invoke a dimmer transfer curve which is suitable to a linear fade for a tungsten lamp. When an LED setting is selected, a different fade curve (called "S" curve) is selected, which makes an LED appear to fade as linearly as possible. These dual fade curves are automatically selected when setting the lamp type but may be manually overridden, if needed. Setting the load type to tungsten or other non-LED load will disable the timing signals 154 so that the load switching circuit 134 will not switch the dummy load 133 into the output of the phase control circuit 132. This allows one or more of the dimmer channels 140 to run cooler if driving tungsten loads.

The firing signal 152 from the microprocessor 130 triggers the gated oscillator 204 to drive the pulse transformer 208 at a particular frequency that is at least two orders of magnitude greater than the frequency of the AC mains voltage 112, which is commonly about 50-60 Hz. The particular driving frequency of the oscillator 204 may range from about 2 kHz to about 100 kHz, optionally around 35 KHz. The firing signal 152 is stable in time and so the phase control circuitry 132 is configured to be equally as stable. The oscillator 204 rests in a known state and will start up in the exact same manner each and every time and will oscillate at a known frequency in order to drive the Triac 210 with the least jitter possible. This predicable timing of the phase control circuitry 132 helps to provide stable LED intensity from cycle to cycle.

The dummy load resistor 133 is switched into the circuit for a half-cycle portion toward the end of the mains ½ cycle by the microprocessor 130. The resistance value of the load resistor 133 and the firing timing is a tradeoff between:

Being able to discharge the load line capacitance;
The load resistor 133 not failing due to overheating; and
Being of a size suitable for manufacturing and cost considerations.

If the firing is too long, the load resistor 133 will overheat; if the firing is too short, the load resistor may have insufficient time to discharge the line capacitance.

The usable portion of the mains half cycle is between approximately 10 degrees and 170 degrees of the sine wave. Driving the load outside these values generally does not produce any tangible benefit. So the load resistor and firing angle of the compensation circuit uses this 'ineffective' time at the back end of the AC ½ cycle to dump the line charge. This offers a small window of opportunity to dump the line charge and so the resistor size and drive timing are dependent at least in part on this last 10 degrees of timing.

The resistance value selected for the dummy load 133 resistor may be 100 ohms, for example, although other suitable resistance values may be used instead, for example in the range of about 80-120 ohms. The dummy load 133 need not be a single resistor. Rather, the dummy load 133 may comprise a suitable configuration of resistors that provide a similar load of around 80-120 ohms. If the resistance of the dummy load 133 is selected to be too high, then the load switching circuit 134 will need to be switched on for too long to dump the charge and this can start to affect the low dim level operation of the dimmer, which is important for LEDs. If the resistance of the dummy load 133 is selected to be too low, then there can be large currents flowing in the system, which can stress the dummy load 130 beyond its operational parameters. In full ½ cycle terms, a 100 ohm dummy load is equivalent to a 576 watt load as given by the formula:

$$P=V^2/R;$$

where P=240*240/100 and therefore P=576 WATTS.

The equivalent rating of the 100 ohm dummy load resistor 133 is therefore 576 Watts if it were switched in at all times. However, the rating of the load resistor 133 can be much lower, and need only be around 25 W, for example, because it is only switched into parallel with the output of the voltage control circuit 132 for a small portion of the AC half-cycle, representing a small amount of time, as controlled by software code modules (input processing engine 146 and output firing engine 148). This portion of the half-cycle is pre-configured and may be from about 6% to about 10% of the full half-cycle, for example, depending on the level of compensation/dampening pre-selected at user configuration and implemented by the control software. The control system 100 may allow user configuration of the portion of the half-cycle for which the dummy load 133 is switched into parallel with the output of the Triac 210 via a suitable device configuration interface (not shown) in communication with the processor 130 via a serial interface, for example. For LED loads 120 having relatively high capacitance, a high dampening/compensation setting may be used, in which case the portion of the half-cycle may be about 10%, for example. For LED loads 120 having intermediate capacitance, an intermediate dampening/compensation setting may be used, in which case the portion of the half-cycle may be about 8%, for example. For LED loads 120 having relatively low capacitance, a low dampening/compensation setting may be used, in which case the portion of the half-cycle may be about 6%. A portion of 6% to about 10% of the half-cycle translates to a voltage of between 9.2 VRMS and 19.2 VRMS across the load resistor 133, with a resulting power dissipation of between 0.85 W and 3.68 W in the load resistor 133, depending on the pre-selected dampening setting. Switching the dummy load 133 in for this small proportion of the drive cycle allows the equivalent 576 Watt dummy load to be dissipated in a smaller 25 W resistor.

One additional aspect of the LED load 120 in the circuit is that in conjunction with the dimmer inductor, the LED load capacitance and the inductor form a series tuned resonant circuit. The series tuned resonant circuit will have a positive voltage peak at resonance, and in the case of LED lighting loads, this can be as high as 730V. This voltage is high enough to potentially damage the dimmer control circuitry 135 and the LED lamps in LED load 120. The dimmer control circuitry 135 is equipped with transient voltage suppressor diodes (in TVS 220) to limit this voltage excursion to a more reasonable level of approximately 480V. Two transient suppressors may be connected in series to help share the power dissipation when the transient voltage occurs.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. Dimmer control circuitry for LED lighting, comprising:
phase control circuitry to control the supply of voltage to at least one LED load, wherein the control circuitry comprises:
an AC switch to selectively provide voltage to the LED load for a first portion of a half cycle of an AC supply voltage, and
a drive component to drive the AC switch so that the AC switch remains on for the first portion of the half cycle; and
load switching circuitry to couple a dissipative load to an output of the AC switch during a second portion of the half cycle.

2. The circuitry of claim 1, further comprising the dissipative load, wherein the dissipative load comprises a resistor.

3. The circuitry of claim 1, wherein the AC switch comprises a Triac.

4. The circuitry of claim 1, wherein the drive component comprises a transformer arranged to provide a drive current to the AC switch.

5. The circuitry of claim 4, wherein the drive component comprises a gated oscillator to drive the transformer at a drive frequency that is at least two orders of magnitude higher than a frequency of an AC mains supply to which the circuitry is coupled.

6. The circuitry of claim 5, wherein the drive frequency is between about 2 kHz and about 100 kHz.

7. The circuitry of claim 1, wherein the second portion is a predetermined proportion between about 6% and about 10% of the half cycle.

8. The circuitry of claim 1, wherein a phase angle of the first portion is dependent on timing signals received by the voltage control circuitry.

9. The circuitry of claim 1, wherein the voltage supplied to the at least one LED load is a modulated AC mains voltage.

10. The circuitry of claim 1, wherein the LED load comprises a plurality of LED lights in parallel.

11. The circuitry of claim 1, wherein the load switching circuit comprises at least one transient voltage suppressor.

12. The circuitry of claim 1, wherein the load switching circuit comprises a timing circuit to set a time constant of the load switching circuit.

13. The circuitry of claim 1, wherein the load switching circuit comprises a fuse disposed intermediate the dissipative load and an output of the phase control circuitry.

14. A control unit comprising the circuitry of claim 1 and further comprising a processor to generate and transmit first timing signals to the phase control circuitry and second timing signals to the load switching circuitry.

15. The control unit of claim 14, wherein the first timing signals are determined by the processor based on dimmer setting signals received at a control input of the processor.

16. The control unit of claim 14, wherein the second timing signals are generated based on a pre-selected load setting stored in a memory accessible to the processor.

17. The control unit of claim 14, wherein the control unit comprises a plurality of the dimmer control circuitry responsive to the processor to control respective dimmer control channels for respective lighting loads, each lighting load comprising at least one LED or at least one resistive lighting load.

18. A lighting control system comprising the control unit of claim 14 and further comprising a control input interface to provide dimmer setting signals to the processor.

* * * * *